US010478756B2

(12) United States Patent
Yancy et al.

(10) Patent No.: US 10,478,756 B2
(45) Date of Patent: Nov. 19, 2019

(54) LIQUID FUEL CONDITIONING TRAILER (71) Applicant: General Electric Company, Schenectady, NY (US)

(72) Inventors: Clayton Nagata Yancy, Houston, TX (US); Victor Henson, Cleveland, TX (US); Joe Floyd Schornick, Pearland, TX (US); Michael Augustin, Pearland, TX (US); Ebony Wiley, Houston, TX (US); Hamidreza Naasernakhaei, Houston, TX (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 587 days.

(21) Appl. No.: 15/160,082

(22) Filed: May 20, 2016

(65) Prior Publication Data
US 2017/0333814 A1 Nov. 23, 2017

(51) Int. Cl.
*F02C 7/22* (2006.01)
*B01D 21/26* (2006.01)
*B01D 21/00* (2006.01)
*B01D 17/02* (2006.01)

(52) U.S. Cl.
CPC ....... *B01D 21/262* (2013.01); *B01D 17/0217* (2013.01); *B01D 21/0012* (2013.01); *F02C 7/22* (2013.01); *F05D 2260/607* (2013.01)

(58) Field of Classification Search
None
See application file for complete search history.

(56) References Cited

U.S. PATENT DOCUMENTS

| 3,491,889 | A | 1/1970 | Walters |
| 7,223,298 | B2 | 5/2007 | Platt et al. |
| 7,314,497 | B2 | 1/2008 | Kahlbaugh et al. |
| 9,140,110 | B2 | 9/2015 | Coli et al. |
| 2009/0078632 | A1* | 3/2009 | Gallo ................ B01D 17/0208 210/178 |
| 2014/0096974 | A1* | 4/2014 | Coli ........................ E21B 43/26 166/358 |
| 2016/0248230 | A1* | 8/2016 | Tawy ..................... F01D 15/10 |

OTHER PUBLICATIONS

Kaplan et al., "Liquid Fuel Treatment Systems", GE Power Generation, published 1996, 20 total pages. (Year: 1996).*
Mingyin et al., "Machine Translation of CN101863529", published 2010, 20 total pages. (Year: 2010).*

* cited by examiner

Primary Examiner — Jonathan M Peo
(74) Attorney, Agent, or Firm — Fletcher Yoder, P.C.

(57) ABSTRACT

A modularized system for conditioning liquid fuel is provided that includes a mobile trailer and a liquid fuel conditioning skid disposed on and secured to the mobile trailer. The modularized system includes a pre-filter sub-skid disposed on and secured to the liquid fuel conditioning skid that includes a pre-filter configured to remove impurities from a processed liquid fuel prior to providing the processed liquid fuel to a last chance filter. The modularized system includes a last chance filter sub-skid disposed on and secured to the liquid fuel conditioning skid that includes a last chance filter configured to remove impurities from the processed liquid fuel prior to providing the processed liquid fuel to a gas turbine engine. The pre-filter sub-skid and the last chance filter sub-skid are coupled together via piping enabling flow the processed liquid fuel between the pre-filter sub-skid and the last chance filter sub-skid.

13 Claims, 5 Drawing Sheets

LIQUID FUEL CONDITIONING TRAILER

BACKGROUND

The subject matter disclosed herein relates to power generation systems and, more specifically, a liquid fuel conditioning trailer for a power plant.

Power plants may utilize gas turbine engines to generate power. These power plants may include gas turbine engines that utilize liquid fuel. However, to utilize the liquid fuel, the liquid fuel may need to be conditioned (e.g., remove impurities and contaminants such as water and particulates). In certain locations where liquid fuel is available, it may be desirable to quickly setup a power generation system or power plant quickly to start producing power. However, the equipment utilized to condition liquid fuel takes time to setup and integrate with the rest of the power plant.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In accordance with a first embodiment, a modularized system for conditioning liquid fuel for a power plant is provided. The modularized system includes a mobile trailer and a liquid fuel conditioning skid disposed and secured to the mobile trailer. The modularized system also includes a pre-filter sub-skid disposed on and secured to the liquid fuel conditioning skid. The pre-filter sub-skid includes a pre-filter configured to remove impurities from a processed liquid fuel prior to providing the processed liquid fuel to a last chance filter. The modularized system further includes a last chance filter sub-skid disposed on and secured to the liquid fuel conditioning skid. The last chance filter sub-skid includes a last chance filter configured to remove impurities from the processed liquid fuel received from the pre-filter sub-skid prior to providing the processed liquid fuel to a gas turbine engine of the power plant. The pre-filter sub-skid and the last chance filter sub-skid are coupled together via a first set of piping enabling flow the processed liquid fuel between the pre-filter sub-skid and the last chance filter-sub-skid.

In accordance with a second embodiment, a power plant is provided. The power plant includes at least one gas turbine engine, a buffer tank for storing processed liquid fuel, a storage tank for storing raw liquid fuel, and a modularized system for conditioning liquid fuel for the power plant. The modularized system includes a liquid fuel conditioning skid. The liquid fuel conditioning skid includes a pre-filter sub-skid disposed on and secured to the liquid fuel conditioning skid. The pre-filter sub-skid includes a pre-filter configured to remove impurities from a processed liquid fuel prior to providing processed liquid fuel to a last chance filter. The liquid fuel conditioning skid also includes a last chance filter sub-skid disposed on and secured to the liquid fuel conditioning skid and coupled to the at least one gas turbine engine, wherein the last chance filter sub-skid includes a last chance filter configured to remove impurities from the processed liquid fuel received from the pre-filter sub-skid prior to providing the processed liquid fuel to the at least one gas turbine engine. The pre-filter sub-skid and the last chance filter sub-skid are coupled together via a first set of piping enabling low of the processed liquid fuel between the pre-filter sub-skid and the last chance filter sub-skid.

In accordance with a third embodiment, a modularized system for conditioning liquid fuel for a power plant is provided. The modularized system includes a mobile trailer and a liquid fuel conditioning skid disposed on and secured to the mobile trailer. The modularized system also includes a pre-filter sub-skid disposed on and secured to the liquid fuel conditioning skid. The pre-filter sub-skid includes a pre-filter configured to remove impurities from a processed liquid fuel prior to providing the processed liquid fuel to a last chance filter. The modularized system further includes a last chance filter sub-skid disposed on and secured to the liquid fuel conditioning skid, wherein the last chance filter sub-skid includes a last chance filter configured to remove impurities from the processed liquid fuel received from the pre-filter sub-skid prior to providing the processed liquid fuel to a gas turbine engine of the power plant. The modularized system still further includes electrical circuitry for a grounding system. The electrical system for the grounding system is already completed for the modularized system prior both to transport of the modularized system to the power plant and to coupling of the modularized system to the power plant. The yet further includes interconnect piping coupling together the pre-filter sub-skid and the last chance filter sub-skid enabling flow of the processed liquid fuel between the pre-filter sub-ski and the last chance filter sub-skid. The interconnect piping is coupled to the pre-filter sub-skid and the last chance filter sub-skid and flushed prior both to transport of the modularized system to the power plant and to coupling of the modularized system to the power plant.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein.

DETAILED DESCRIPTION

One or more specific embodiments of the present subject matter will be described below. In an effort to provide a concise description of these embodiments, all features of an actual implementation may not be described in the specification. It should be appreciated that in the development of any such actual implementation, as in any engineering project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements.

The present disclosure is directed towards a modularized system (mobile liquid fuel conditioning skid) for conditioning liquid fuel (e.g., light distillate fuels such as diesels, kerosenses, and naphthas, etc.) for a power plant. The modularized system includes a mobile trailer and a liquid fuel conditioning skid disposed on and secured to the mobile trailer. The modularized system includes various modules or sub-skids disposed on and secured to the liquid fuel conditioning skid and/or the mobile trailer that include components for conditioning liquid fuel. For example, the modules or sub-skids may include a pre-filter sub-skid that includes a pre-filter (e.g., depth filter) configured to remove impurities from a processed liquid fuel prior to providing the liquid fuel to a last chance filter. The modules or sub-skids may also include a last chance filter sub-skid that includes a last chance filter (e.g., low pressure filter) configured to remove impurities from the processed liquid fuel prior to providing the processed liquid fuel to one or more gas turbines of the power plant. The modules or sub-skids may further include a forwarding sub-skid that includes at least one pump (forwarding pump) to move fuel from one place to another (e.g., receive the processed liquid fuel from a buffer tank and to provide the processed liquid fuel to the pre-filter). The modules or sub-skids may still further include a centrifuge sub-skid that includes a centrifuge configured to receive a raw liquid fuel (e.g., from a storage tank), to remove impurities from the raw liquid fuel, and to provide the processed liquid fuel to the buffer tank. In certain embodiments, the modules or sub-skids may also include a water tank sub-skid that includes a water tank (e.g., made of polyethylene) and a pump configured to provide water to the centrifuge to flush the centrifuge of sludge or to inject water into the fuel supply.

The mobile trailer and the liquid fuel conditioning skid including all of the modules or sub-skids may be transported as an integrated assembly by land, air, water. As an integrated assembly, the components of the modules or sub-skids may be connected via interconnect piping (and flushed) prior both to transport to the power plant and to coupling of the modularized system to the power plant. Also, as an integrated assembly, the components of the modules or sub-skids may be pre-wired and coupled via electrical circuitry prior both to transport to the power plant and to coupling of the modularized system to the power plant. For example, the electrical circuitry for a grounding system may already be completed. The modularized system may include a single electrical interface (or location) for electrically coupling the modularized system to the power plant. From a controls standpoint, the controls (e.g., controller) are completely integrated throughout the modularized system. Thus, the controller of the modularized system is configured to be integrated within the distributed control system of the power plant. In certain embodiments, liquid fuel conditioning skid may be removed from the mobile trailer. In other embodiments, one or more of the modules or skids may be removed from the liquid fuel conditioning skid (e.g., prior to or after transport to the power plant). Thus, the modularized system may function both as separate pieces and in a fully integrated assembly to provide a plug-and-play system. The advantages of the modularized system include mobility, reduced installation time (e.g., from 30 days to 4 to 7 days), reduced installation costs, and simplified logistics.

FIGS. 1-4 are different views of an embodiment of a modularized system 10 (e.g., without an awning) for liquid fuel conditioning. The modularized system 10 (e.g., mobile liquid fuel conditioning skid) includes a mobile trailer 12 and a liquid fuel conditioning skid 14 disposed on and secured (e.g., via fasteners such as bolts) to the mobile trailer 12. The modularized system 10 includes multiple modules or sub-skids 16 that include different components for conditioning liquid fuel for utilization by a power plant (e.g., by one or more gas turbine engines). The modules or sub-skids 16 are disposed on and secured (e.g., via fasteners such as bolts) to the liquid fuel conditioning skid 14 and/or the mobile trailer 12. The mobile trailer 12 enables the liquid fuel conditioning skid 14 to be transported to different locations. The modularized system 10 may be transported via land, air, or water as a single integrated assembly (e.g., already coupled via electrical circuitry and interconnecting piping). In certain embodiments, one or more of the modules or sub-skids 16 may be removed (after unfastening or unbolting) from the liquid fuel conditioning skid 14 and/or the mobile trailer 12 prior to transport for separate transportation from the rest of the modularized system 10. Alternatively, one or more of the modules or sub-skids 16 may be removed (after unfastening or unbolting) from the liquid fuel conditioning skid 14 and/or the mobile trailer 12 upon arrival at the power plant.

Although FIGS. 1-4 depict the modules or sub-skids 16 in a particular arrangement, the modules or sub-skids 16 may be arranged on the liquid fuel conditioning skid 14 in any number of different arrangements. The modularized system 10 includes a water tank sub-skid coupled to the mobile trailer 12. As depicted, the liquid fuel conditioning skid 14 includes a centrifuge sub-skid 20, a forwarding sub-skid 22, a pre-filter sub-skid 24, and a last chance filter sub-skid 26. The water tank sub-skid 18 includes a water tank 28 and a pump 30 (or bladder/pump assembly) configured to provide water (or another fluid) to flush sludge from a centrifuge 32 of the centrifuge sub-skid 20. The water tank 28 and the pump 30 are coupled to centrifuge via a conduit or interconnect piping (not shown). The water tank 28 may be made of a material (e.g., polyethylene) that is both resistant to ultraviolet radiation while being able to handle fluids of a certain temperature.

The centrifuge sub-skid 20 includes the centrifuge 32 (e.g., single or simplex centrifuge) configured to receive a raw liquid fuel from one or more storage tanks, to remove impurities (e.g., water and particulates) from the raw liquid fuel to generate a processed (e.g., cleaner) liquid fuel, and to provide the process liquid fuel to one or more buffer tanks. The centrifuge sub-skid 20 also includes a centrifuge drain connector 34 configured to couple to a tank (oily drain tank) via a conduit or piping to enable oily water to be drained from the centrifuge 32. The centrifuge sub-skid 20 further includes a processed (e.g., clean) liquid fuel connector or outlet 36 configured to couple to one or more buffers tanks via a conduit or piping to enable flow of the processed liquid fuel from the centrifuge 32 to the buffer tanks. The centrifuge sub-skid 20 further includes a raw fuel connector or inlet 38 configured to couple to one or more storage tanks (e.g., raw liquid fuel storage tanks) via a conduit or piping to enable the centrifuge 32 to receive raw liquid fuel from the storage tanks. As described, in greater detail below, the centrifuge sub-skid 20 also includes a single electrical interface 40 (e.g., junction box) for electrically coupling the modularized system 10 to the power plant.

As depicted, the forwarding sub-skid 22 includes one or more pumps 42 (e.g., forwarding pumps) configured to receive the processed liquid fuel from the one or more buffer tanks and to provide the processed liquid fuel to a pre-filter 44 on the pre-filter sub-skid 24. As depicted, the forwarding sub-skid 22 include a pair of pumps 42 in a duplex arrangement where one of the pumps 42 is on duty while the other pump 42 is on stand-by. The forwarding sub-skid 22 also includes a processed fuel connector or inlet 46 configured to couple to one or more buffers tanks via a conduit or piping to enable the one or more pumps 42 to receive the processed liquid fuel from the one or more buffer tanks. In certain embodiments, the forwarding sub-skid 22 may also include auxiliary pump connector 48 to couple the forwarding sub-skid 22 to an auxiliary pump. The forwarding pump skid external piping can be reconfigured as needed to move fuel as needed. It and the centrifuge skid both have the ability to move fuel from one place to another just by changing the connections to each. While the conditioning skid is already configured to clean and move fuel in a certain way, it does not mean that its piping cannot be altered if need be.

The pre-filter sub-skid 24 includes the pre-filter 44 (e.g., simplex/organic depth filter) configured to receive processed liquid fuel from the pumps 42, to further remove impurities (e.g., particles) from the processed liquid fuel prior to providing the liquid fuel to a last chance filter 46 on the last chance filter sub-skid 26, and to provide the processed liquid fuel to the last chance filter 50. In certain embodiments, the pre-filter sub-skid 24 may include more than one pre-filter 44. The pre-filter sub-skid 24 also includes a raw fuel connector or inlet 52 configured to couple to one or more storage tanks (e.g., raw liquid fuel storage tanks) via a conduit or piping to enable the centrifuge 32 to receive raw liquid fuel from the storage tanks.

As depicted, the last chance filter sub-skid 26 includes the last chance filter 50 (e.g., low pressure duplex filter assembly). The last chance filter 50 is configured to receive the processed liquid fuel from the pre-filter 44, to remove impurities from the processed liquid fuel received from the pre-filter 44 prior to providing the processed liquid fuel to a downstream destination (e.g., to an auxiliary skid or one or more gas turbine engines of the power plant), and to provide the processed liquid fuel to the downstream destination. The last chance filter sub-skid 26 also includes a processed fuel connector or outlet 54 configured to couple to the downstream destination (e.g., gas turbine engine) via a conduit or piping to enable flow the processed fuel to the downstream destination. The centrifuge sub-skid 20 also includes a last chance filter drain connector 56 configured to couple to a tank (oily drain tank) via a conduit or piping to enable oily water to be drained from the last chance filter 50.

The liquid fuel conditioning skid 14 includes multiple skid drains 58. As depicted, the liquid fuel conditioning skid 14 includes skid drains 58 adjacent the last chance filter sub-skid 26 and the centrifuge sub-skid 20.

Each of the modules or sub-skids 16 is interconnected with one or more of the other sub-skids 16 via interconnect piping 60. As depicted, the sub-skids 16 are interconnected via the piping at locations 62, 64, and 66. Prior to transport of modularized system 10 to the power plant, the sub-skids 16 are interconnected via the piping 60 and the piping 60 is flushed. Thus, the time of installing the modularized system 10 at the power plant is reduced. If a particular sub-skid 16 is to be transported separately from the other sub-skids 16, the interconnect piping can be disconnected.

In addition, the modules or sub-skids 16 are interconnected via electrical wiring. The electrical wiring (including the electrical wiring for a grounding system) is already completed for the modularized system 10 prior to transport to the power plant. All of wiring for the modules or sub-skids 16 ties into a single electrical interface (e.g., common junction box). Thus, the power plant may be coupled the modularized system 10 via the single electrical interface 40. If a particular sub-skid 16 is to be transported separately from the other sub-skids 16, the interconnecting electrical wiring can be disconnected. As described above, the single electrical interface 40 may be located on the centrifuge sub-skid 20. In other embodiments, the single electrical interface 40 may be located on another module or sub-skid 16.

The single electrical interface 40 may also include a controller for controlling the operation of the modularized system 10 including the liquid fuel conditioning skid 14. The controller includes processing circuitry (e.g., processor) and memory circuitry (e.g., memory). The processor may include multiple microprocessors, one or more "general-purpose" microprocessors, one or more special-purpose microprocessors, and/or one or more application specific integrated circuits (ASICS), system-on-chip (SoC) device, or some other processor configuration. For example, the processor may include one or more reduced instruction set (RISC) processors or complex instruction set (CISC) processors. The processor may execute instructions to carry out the operation of the modularized system 10 including the liquid fuel conditioning skid 14. These instructions may be encoded in programs or code stored in a tangible non-transitory computer-readable medium (e.g., an optical disc, solid state device, chip, firmware, etc.) such as the memory. In certain embodiments, the memory may be wholly or partially removable from the controller. The single electrical interface 40 enables the modularized system 10 to be integrated into the power plant's distributed control system. As noted above, the modularized system 10 may function both as separate pieces and in a fully integrated assembly to provide a plug-and-play system. The advantages of the modularized system 10 include mobility, reduced installation time (e.g., from 30 days to 4 to 7 days), reduced installation costs, and simplified logistics.

Figures 1, 5:
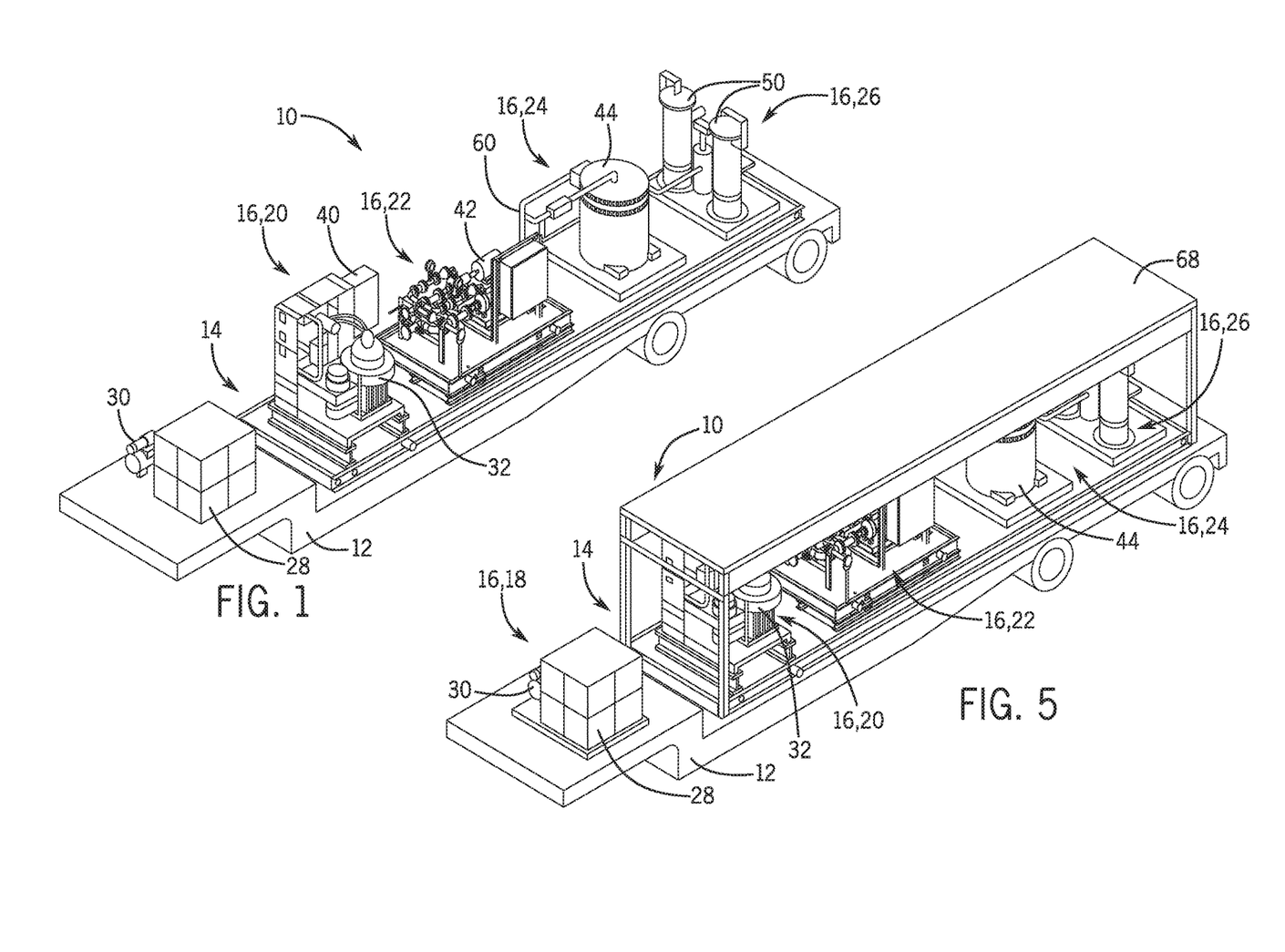
FIG. 1 is a perspective view of an embodiment of a modularized system for liquid fuel conditioning (e.g., without an awning)
FIG. 5 is a perspective view of an embodiment of a modularized system for liquid fuel conditioning (e.g., with an awning)
Figure 2:
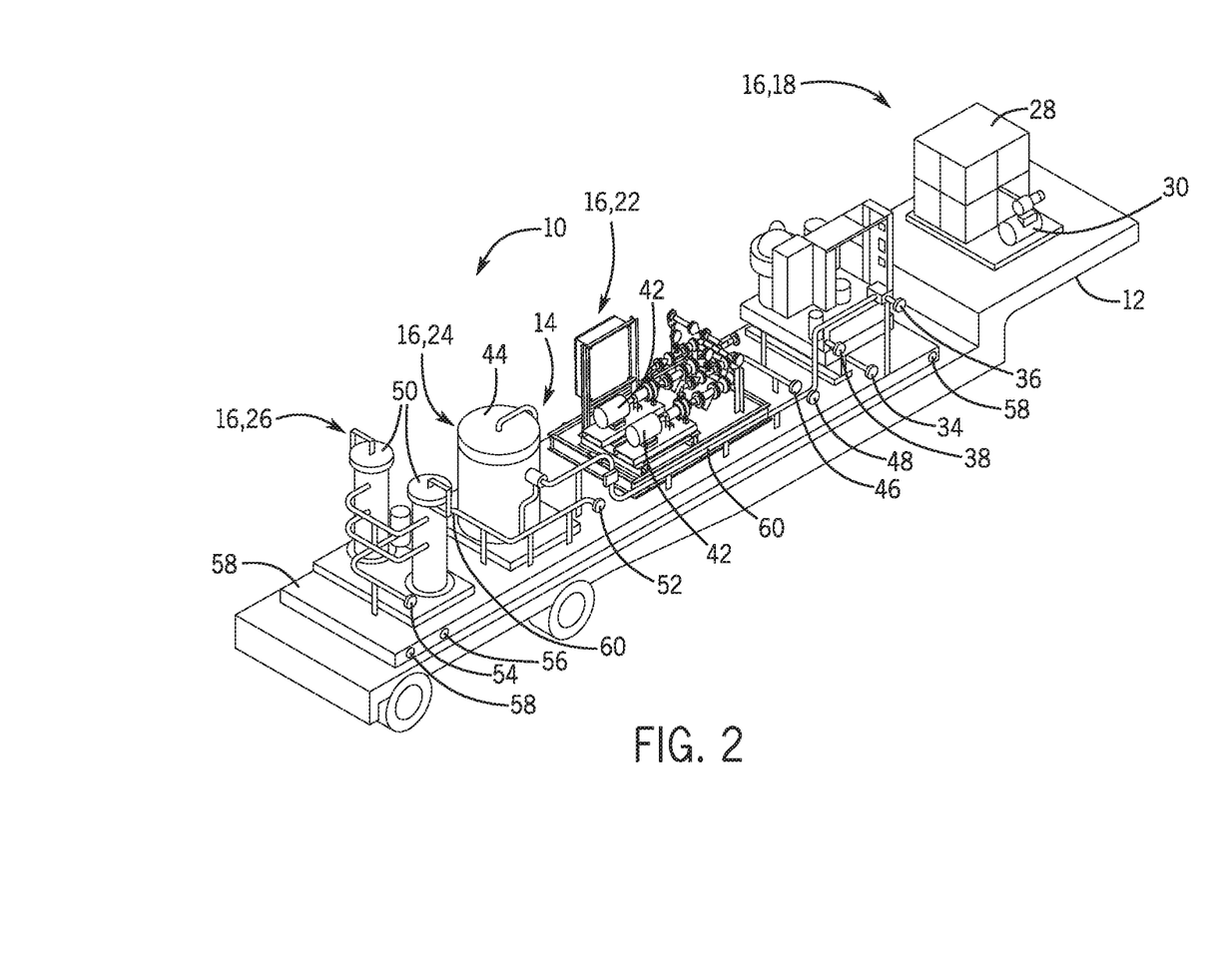
FIG. 2 is another perspective view of the modularized system for liquid fuel conditioning in FIG. 1.
Figure 3:
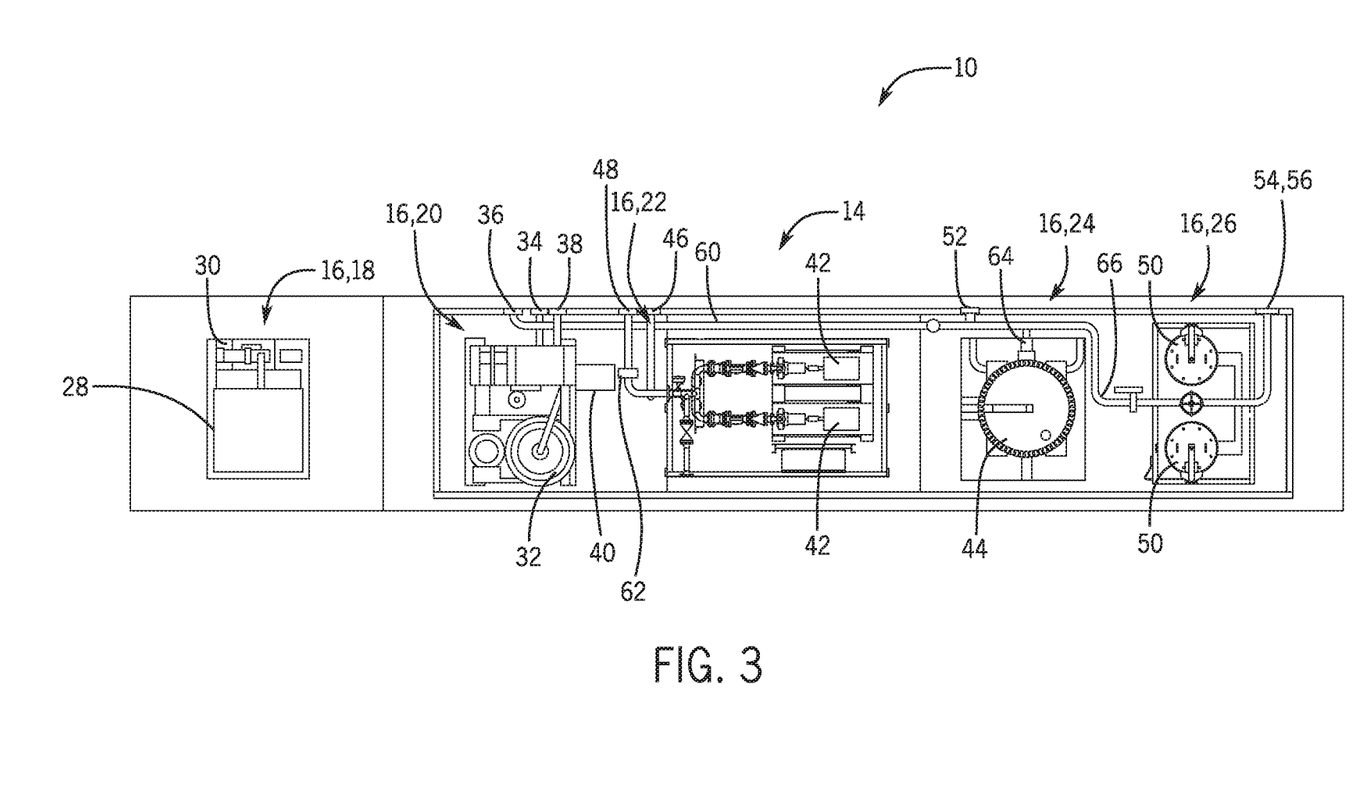
FIG. 3 is top view of the modularized system for liquid fuel conditioning in FIG. 1.
Figure 4:
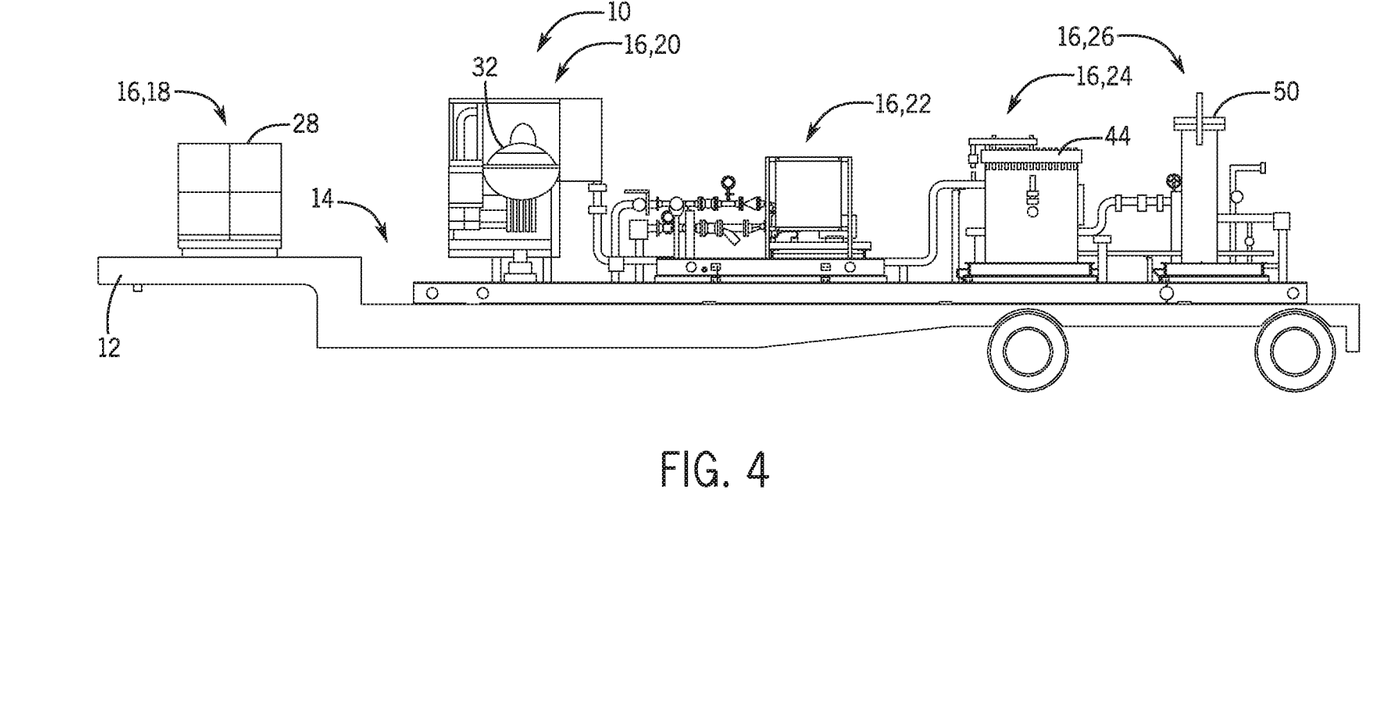
FIG. 4 is a side view of the modularized system for liquid fuel conditioning in FIG. 1.

In certain embodiments, the modularized system 10 may include other components. For example, the modularized system may include an additional skid for an offloading filter/pump for helping the liquid fuel meet a desired fuel specification. Also, the modularized system 10 may include a tool box or took kit that provides tools for use with the modularized system 10. In certain embodiments, the modularized system 10 may include an awning 68 (as depicted in FIG. 5) disposed over some of the sub-skids 16. As shown in FIG. 5, the awning 68 is disposed over the centrifuge sub-skid 20, the forwarding sub-skid 22, the pre-filter sub-skid 24, and the last chance filter sub-skid 26.

Figure 6:
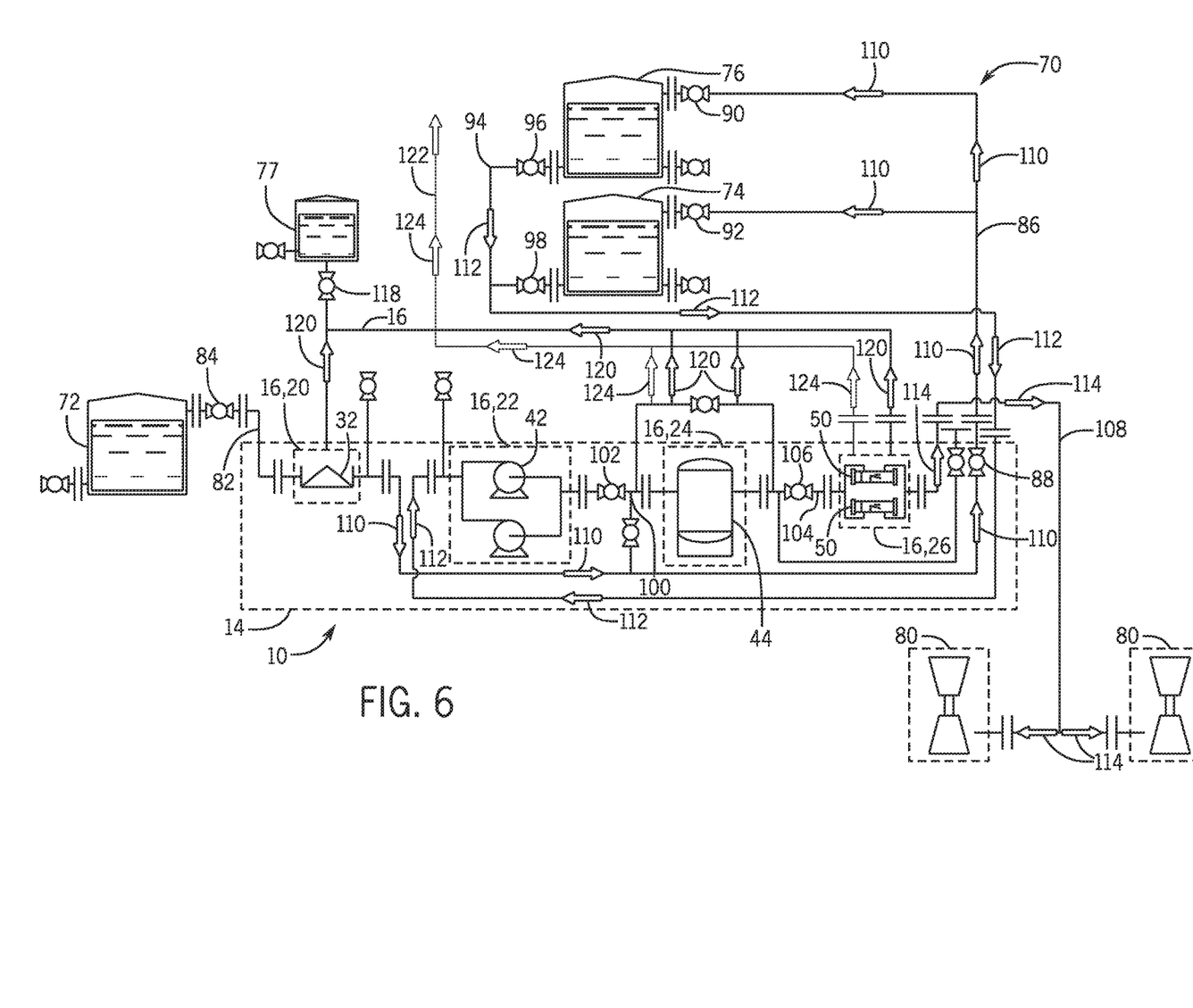
FIG. 6 is a schematic diagram of an embodiment of a power plant having a modularized system for liquid fuel conditioning.

FIG. 6 is a schematic diagram of an embodiment of a power plant 70 having the modularized system 10 for liquid fuel conditioning. In general the modularized system 10 is as described above. The power plant 70 also includes a storage tank 72 (e.g., with floating suction) for storing raw liquid fuel. The power plant 70 further includes buffer tanks 74, 76 for receiving from (e.g., the centrifuge 32) and providing to (e.g., the pumps 42) the liquid fuel conditioning skid 14 processed liquid fuel. The power plant 70 even further includes an oily drain tank 77 for receiving oily water from the liquid fuel conditioning skid 14. The power plant 70 still further includes gas turbine engines 80 for receiving the liquid fuel subsequent to conditioning by the liquid fuel conditioning skid 14. In certain embodiments, these gas turbine engines 80 may be coupled to generators. It should be noted the power plant 70 may include other components (e.g., control modules, liquid fuel waste tanks, transformers, generators, auxiliary skid or module, etc.). It should also be noted that modularized system 10 may be deployed anywhere within the power plant 70 (e.g., adjacent the gas turbine engines 80, adjacent the buffer tanks 74, 76, adjacent the storages tanks 72, etc.). It should also be noted that the modules or sub-skids 16 of the modularized system 10 may be utilized at the power plant 70 as an integrated assembly on the liquid fuel conditioning skid 14 and/or the mobile trailer 12 or with one or more of the sub-skids 16 deployed off of the liquid fuel conditioning skid 14 and/or the mobile trailer 12.

The storage tank 72 is coupled to the centrifuge 32 and the centrifuge sub-skid 20 via a raw liquid fuel line or conduit 82. For example, the raw liquid fuel line 82 may couple to the centrifuge 32 at the raw fuel connector or inlet 38 (see FIGS. 1-4). A valve 84 (e.g., ball valve, automatic valve, etc.) is disposed along the raw liquid fuel line 82 to regulate the flow of raw liquid fuel to the centrifuge 32. The centrifuge 32 and the centrifuge sub-skid 20 are coupled to the buffers tanks 74, 76 via an incoming processed liquid fuel line 86. For example, the incoming processed liquid fuel line 86 may couple to the centrifuge 32 at the processed (e.g., clean) liquid fuel connector or outlet 36 (see FIGS. 1-4). Valves 88, 90, 92 (e.g., ball valves, automatic valves, etc.) are disposed along the incoming processed liquid fuel line 86 to regulate the flow of processed (e.g., clean) liquid fuel to the buffer tanks 74, 76. The buffer tanks 74, 76 are coupled to the pumps 42 and the forwarding sub-skid 22 via an outgoing processed liquid fuel line 94. For example, the outgoing processed liquid fuel line 94 may couple to the pumps 42 at the processed fuel connector or inlet 46 (see FIGS. 1-4). Valves 96, 98 (e.g., ball valves, automatics valves, etc.) are disposed along the outgoing processed liquid fuel line 94 to regulate the flow of processed (e.g., clean) liquid fuel to the pumps 42. The pumps 42 and the forwarding sub-skid 22 are coupled to the pre-filter 44 and the pre-filter sub-skid 24 via interconnect piping 100. Valve 102 may be disposed along the interconnect piping 100 to regulate the flow of processed liquid fuel form the pumps 42 to the pre-filter 44. The pre-filter 44 and the pre-filter sub-skid 24 are coupled to the last chance filter 50 and the last chance filter sub-skid 26 via interconnect piping 104. Valve 106 may be disposed along the interconnect piping 104 to regulate the flow of the processed liquid fuel from the pre-filter 44 to the last chance filter 50. The last chance filter 50 and the last chance filter sub-skid 26 are coupled to the gas turbine engines 80 via a conditioned liquid fuel line 108. For example, the conditioned liquid fuel line 108 may be coupled to the last chance filter 50 and the last chance filter sub-skid 26 via the processed fuel connector or outlet 54 (see FIGS. 1-4). In certain embodiments, valves 84 88, 990, 92, 96, 98, 102, 106 may be controlled via a controller (e.g., of the liquid fuel conditioning skid 14 and/or the distributed control system of the power plant 70).

When valve 84 is open, raw liquid fuel flows along the raw liquid fuel line 82 from the storage tank 72 to the centrifuge 32 along the raw liquid fuel line 82. The centrifuge 32 removes impurities (e.g., water and particles) from the raw liquid fuel to generate a processed (e.g., cleaner) liquid fuel. When valves 88, 90, 92 are open, processed liquid fuel flows along the incoming processed liquid fuel line 86 to the buffer tanks 74, 76 as indicated by arrows 110. When valves 96, 98 are open, processed liquid fuel flows along the outgoing processed liquid fuel line 94 to the pumps 42 as indicated by arrows 112. The pumps 42 provide the processed liquid fuel to the pre-filter 44. When valve 102 is open, processed liquid fuel flows along the interconnect piping 100 from the pumps 42 to the pre-filter 44. The pre-filter 44 removes further impurities (e.g., particles) from the processed liquid fuel and provides the processed liquid fuel to the last chance filter 50. When valve 106 is open, processed liquid fuel flows along the interconnect piping 104 from the pre-filter 44 to the last chance filter 50. The last chance filter 50 removes even further impurities from the processed liquid fuel and provides the conditioned liquid fuel to the gas turbine engines 80 along the conditioned liquid fuel line 108 as indicated by arrows 114. During this process (i.e., liquid fuel conditioning and providing conditioned liquid fuel to the gas turbine engines 80), additional valves (e.g., fill valves) and drains may be closed.

The oily drain tank 77 is coupled to the liquid fuel conditioning skid 14 at multiple points (e.g., the centrifuge sub-skid 20 at the centrifuge drain connector 34 (see FIGS. 1-4), the pre-filter sub-skid 24, and the last chance filter sub-skid 26 at the last chance filter drain connector 56 (see FIGS. 1-4)) via an oily drain line 116. A valve 118 is disposed along the oily drain line 116. When valve 118 is open oily water may flow along the oily drain line from the liquid fuel conditioning skid 14 to the oily drain tank 77 as indicated by arrows 120.

The liquid fuel conditioning skid 14 is also coupled to a vent line 122 at multiple locations (e.g., the pre-filter sub-skid 24 and the last chance filter sub-skid 26). When the vent line 122 is open, venting may occur along the vent line 122 as indicated by arrows 124.

Technical effects of the disclosed embodiments include a modularized system for liquid fuel conditioning. The modularized system includes multiple modules or sub-skids that include components for conditioning liquid fuel for utilization by a power plant. The modules or sub-skids form a liquid fuel conditioning skid disposed on a mobile trailer. Prior to transportation, the modules or sub-skids may be interconnected (via electrical wiring and interconnect piping). In addition, the modularized system may include a single electrical interface for electrically coupling to the power plant. Some of the advantages of the modularized system include mobility, reduced installation time (e.g., from 30 days to 4 to 7 days), reduced installation costs, and simplified logistics.

This written description uses examples to disclose the subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A modularized system for conditioning liquid fuel, comprising:
    a mobile trailer;

a liquid fuel conditioning skid disposed on and secured to the mobile trailer;

a pre-filter sub-skid disposed on and secured to the liquid fuel conditioning skid, wherein the pre-filter sub-skid comprises a pre-filter configured to remove impurities from a processed liquid fuel prior to providing the processed liquid fuel to a last chance filter; and a last chance filter sub-skid disposed on and secured to the liquid fuel conditioning skid, wherein the last chance filter sub-skid is separate from the pre-filter sub-skid, and wherein the last chance filter sub-skid comprises a last chance filter configured to remove second impurities from the processed liquid fuel received from the pre-filter sub-skid prior to providing the processed liquid fuel to a gas turbine engine of a power plant;

wherein the pre-filter sub-skid and the last chance filter sub-skid are coupled together via a first set of piping enabling flow of the processed liquid fuel between the pre-filter sub-skid and the last chance filter sub-skid, and wherein the last chance filter sub-skid and the pre-filter sub-skid are separate from the liquid fuel conditioning skid.

2. The modularized system of claim 1, comprising a forwarding sub-skid disposed on and secured to the liquid fuel conditioning skid, wherein the forwarding sub-skid comprises at least one pump configured to receive the processed liquid fuel from a buffer tank and to provide the processed liquid fuel to the pre-filter, wherein the forwarding sub-skid and the pre-filter sub-skid are coupled together via a second set of piping enabling flow of the processed liquid fuel between the forwarding sub-skid and the pre-filter sub-skid.

3. The modularized system of claim 2, comprising a centrifuge sub-skid disposed on and secured to the liquid fuel conditioning skid, wherein the centrifuge sub-skid comprises a centrifuge configured to receive a raw liquid fuel, to remove third impurities from the raw liquid fuel to generate the processed liquid fuel, and to provide the processed liquid fuel to the buffer tank.

4. The modularized system of claim 3, comprising a water tank sub-skid disposed on and secured to the mobile trailer, wherein the water tank sub-skid comprises a water tank and a pump configured to provide water to the centrifuge to flush the centrifuge of sludge, wherein the water tank sub-skid and the centrifuge sub-skid are coupled together via a third set of piping enabling flow of the water between the water tank sub-skid and the centrifuge sub-skid.

5. The modularized system of claim 4, wherein the mobile trailer is configured to transport the liquid fuel conditioning skid while the pre-filter sub-skid, the last chance filter sub-skid, the forwarding sub-skid, the centrifuge sub-skid, and the water tank sub-skid are disposed on and secured to the liquid fuel conditioning skid.

6. The modularized system of claim 4, wherein the liquid fuel conditioning skid is configured to be removed from the mobile trailer while the pre-filter sub-skid, the last chance filter sub-skid, the forwarding sub-skid, the centrifuge sub-skid, and the water tank sub-skid are disposed on and secured to the liquid fuel conditioning skid.

7. The modularized system of claim 4, wherein at least one of the pre-filter sub-skid, the last chance filter sub-skid, the forwarding sub-skid, and the centrifuge sub-skid is configured to be removed from the liquid fuel conditioning skid.

8. The modularized system of claim 7, wherein each of the pre-filter sub-skid, the last chance filter sub-skid, the forwarding sub-skid, and the centrifuge sub-skid is configured to be removed from the liquid fuel conditioning skid.

9. The modularized system of claim 4, wherein interconnect piping between the pre-filter sub-skid, the last chance filter sub-skid, the forwarding sub-skid, the centrifuge sub-skid, and the water tank sub-skid is coupled together and flushed prior both to transport of the modularized system to the power plant and to coupling of the modularized system to the power plant.

10. The modularized system of claim 4, comprising electrical circuitry for a grounding system, and the electrical circuitry for the grounding system is already completed for the modularized system prior both to transport of the modularized system to the power plant and to coupling of the modularized system to the power plant.

11. The modularized system of claim 10, comprising a single electrical interface for electrically coupling the modularized system to the power plant.

12. The modularized system of claim 4, comprising a controller coupled to the centrifuge sub-skid and configured to execute instructions to control components of the liquid fuel conditioning skid to condition the liquid fuel for the power plant, wherein the controller is configured to be integrated within a distributed control system of the power plant.

13. A modularized system for conditioning liquid fuel, comprising:

a mobile trailer;

a liquid fuel conditioning skid disposed on and secured to the mobile trailer;

a pre-filter sub-skid disposed on and secured to the liquid fuel conditioning skid, wherein the pre-filter sub-skid comprises a pre-filter configured to remove impurities from a processed liquid fuel prior to providing the processed liquid fuel to a last chance filter;

a last chance filter sub-skid disposed on and secured to the liquid fuel conditioning skid, wherein the last chance filter sub-skid is separate from the pre-filter sub-skid, and wherein the last chance filter sub-skid comprises the last chance filter configured to remove second impurities from the processed liquid fuel received from the pre-filter sub-skid prior to providing the processed liquid fuel to a gas turbine engine of a power plant, and wherein the last chance filter sub-skid and the pre-filter sub-skid are separate from the liquid fuel conditioning skid;

electrical circuitry for a grounding system, wherein the electrical circuitry for the grounding system is already completed for the modularized system prior both to transport of the modularized system to the power plant and to coupling of the modularized system to the power plant; and interconnect piping coupling together the pre-filter sub-skid and the last chance filter sub-skid enabling flow of the processed liquid fuel between the pre-filter sub-skid and the last chance filter sub-skid, wherein the interconnect piping is coupled to the pre-filter sub-skid and the last chance filter sub-skid and flushed prior both to transport of the modularized system to the power plant and to coupling of the modularized system to the power plant.

\* \* \* \* \*